F. G. LYMAN.
GRAIN SEPARATOR AND GRADER.
APPLICATION FILED OCT. 30, 1907.
903,390.
Patented Nov. 10, 1908.
2 SHEETS—SHEET 1.
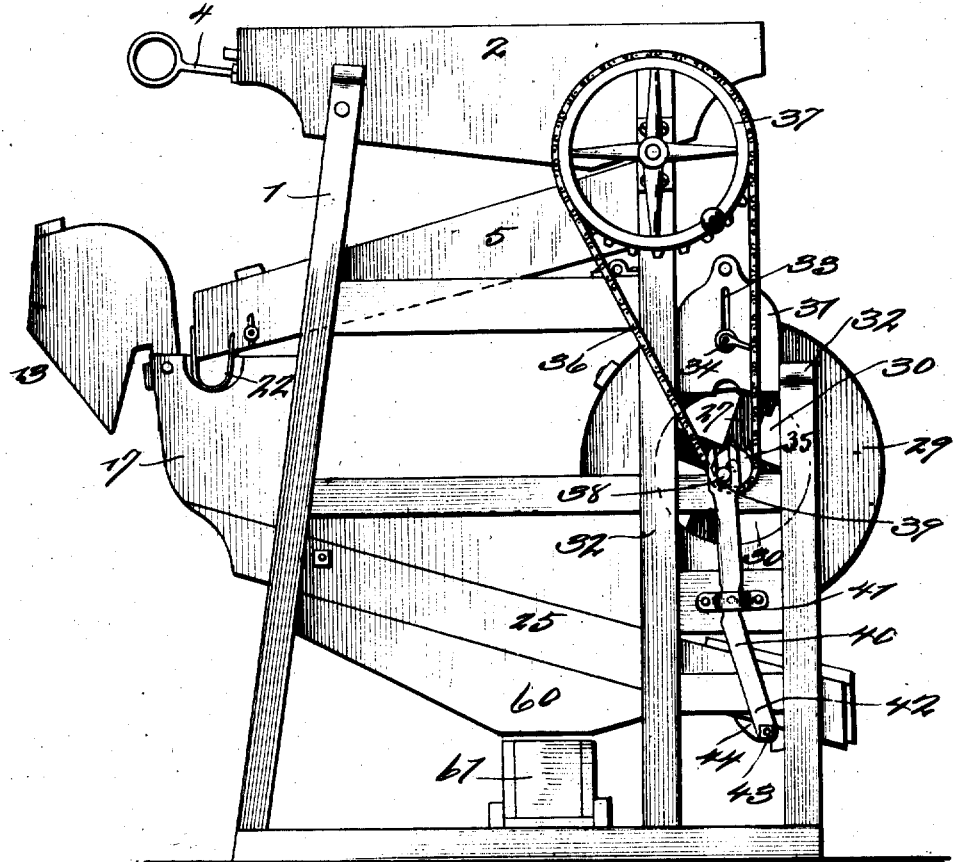
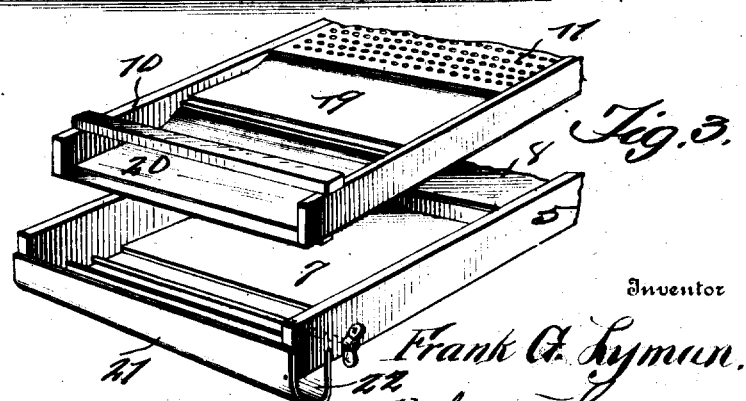

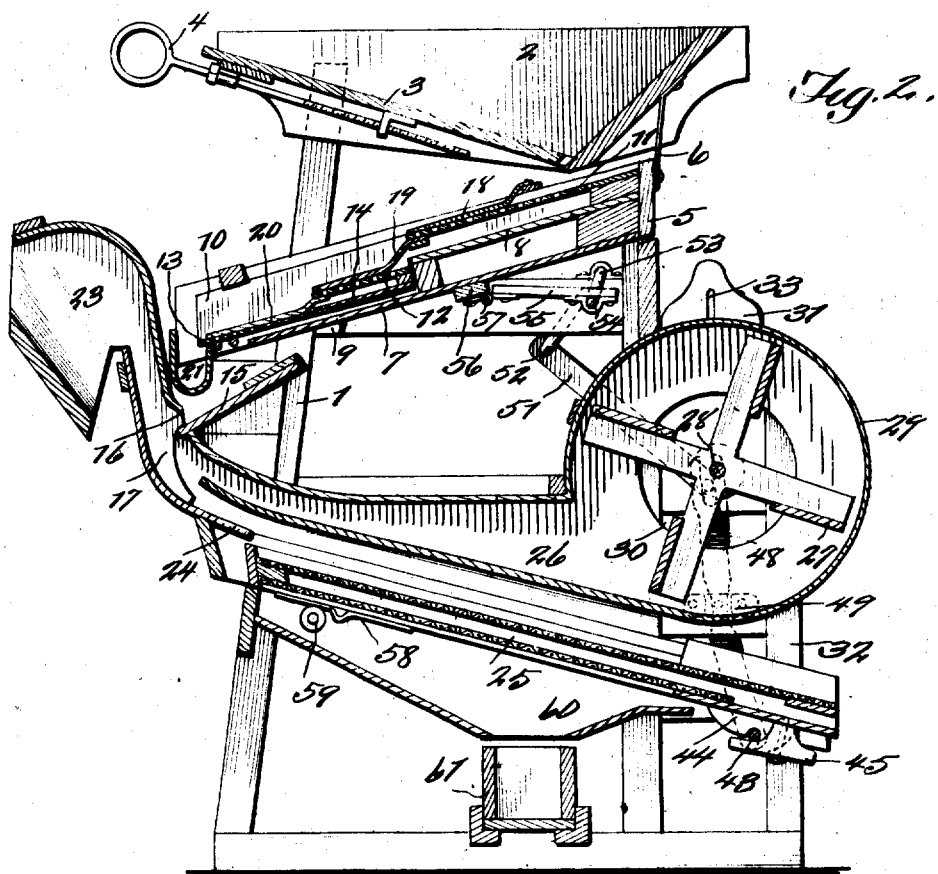

UNITED STATES PATENT OFFICE.

FRANK G. LYMAN, OF WAPAKONETA, OHIO, ASSIGNOR OF ONE-HALF TO JOHN E. GUNTHER, OF WAPAKONETA, OHIO.

GRAIN SEPARATOR AND GRADER.

No. 903,390.　　　　Specification of Letters Patent.　　　　Patented Nov. 10, 1908.

Application filed October 30, 1907. Serial No. 399,953.

*To all whom it may concern:*

Be it known that I, FRANK G. LYMAN, citizen of the United States, residing at Wapakoneta, county of Auglaize, State of Ohio, have invented certain new and useful Improvements in Grain Separators and Graders, of which the following is a specification, reference being had therein to the accompanying drawing.

This invention relates to a grain separator and grader and particularly to a shaking screen construction thereof wherein the grain from the separator is passed through an air blast in its movement by gravity to the grading screen.

The invention has for an object to provide a novel and improved construction of stepped separating screen having aprons thereon so arranged that the grain to be graded passes through a series of screens and beneath the aprons while the material separated from the grain passes over said aprons and is separately discharged.

A further object of the invention is to provide improved connections for positively vibrating the separator and grader shoes at a rapid speed and directly from the shaft of the blast fan.

Other and further objects and advantages of the invention will be hereinafter disclosed and novel features thereof set forth in the appended claims.

In the drawings—Figure 1 is a side elevation of the machine; Fig. 2 a vertical section therethrough; Fig. 3 is a detail perspective of the separating screen and shoe therefor; and Fig. 4 is a similar view of the driving connections for the separating and grading shoes.

Like numerals refer to like parts in the several figures of the drawings.

The numeral 1 designates the frame of the separator which may be of any desired construction or conformation and is provided at its top with a feed hopper 2 having a sliding gate 3 controlled by the rod 4 as usual. Beneath the hopper is an inclined separating shoe 5 supported at its upper end by flexible hangers 6 and having a solid bottom 7 provided with a stepped portion 8. This shoe is mounted upon ways 9 at its lower end to be reciprocated or vibrated as hereinafter described. Fitted within the shoe is a screen frame 10 provided with stepped screens 11, 12, and 13 of downwardly decreasing area.

The grain passing through the screen 11 falls upon the bottom 8 of the shoe and is delivered therefrom to the screen 12. Beneath this screen a solid bottom 14 is disposed and it delivers to the screen 13. Grain passing through the screen 13 falls upon the bottom 7 of the shoe and is discharged at its lower end upon a fall board 15 which extends through an opening 16 in the wind pipe 17. Above the screen 11 and resting thereon an apron 18 is disposed to prevent the upending of oats, sticks or other material during their passage over this screen. Such material passes from beneath this apron onto the top of apron 19 resting upon the screen 12, and the discharge from the apron 19 falls upon the apron 20 resting on the screen 13. The final discharge from the latter apron and the top of the screen 13 is into a transversely disposed trough 21 having an open end 22 at one side of the machine.

The wind pipe is provided at its upper end with a chaff discharge 23 directed away from the separator. The lower end of the pipe is formed with a delivery plate 24 disposed at the head of a grader shoe 25. Communicating with this end of the pipe is a wind passage 26 from the fan 27 having the opposite ends of its shaft 28 mounted upon the machine frame. The fan casing 29 is formed with openings 30 at opposite sides and draft boards 31 are slidingly mounted between the posts 32 to close these openings. These boards are slotted at 33 to receive bolts from the fan casing and are adjustably held in position by lever nuts 34 threaded upon these bolts.

The fan shaft is provided with a sprocket wheel 35 on one end from which a driving chain 36 extends to a hand wheel 37 pivotally mounted at the upper portion of the machine. The sprocket has thereon an eccentrically disposed pin 38 embraced within the bifurcated upper end 39 of the vibrating lever 40 which is pivoted by the keeper 41 while its lower end 42 carries a cross rod 43 upon which the lower end of the grader shoe is mounted. For this purpose the shoe is provided with a socket 44 upon its under face and a pivoted latch 45 mounted at one side of the rod so as to prevent disengagement of the shoe therefrom when in the position shown in Fig. 2. By swinging this latch away from the socket the shoe may be readily removed from the machine. The fan shaft is provided with a crank pin 46 at the opposite side from the sprocket wheel thereon. This pin is disposed in the forked upper end 47 of the lever 48 which is pivoted in keeper 49 and connected at its lower end 50 with the cross rod 43 the same as the lever 40. The pin 46 is also pivotally connected to a pitman 51 extending to a crank arm 52 at one end of a rock shaft 53. This shaft has a crank portion 54 intermediate of its ends to which a link 55 is pivoted. The opposite end of this link is connected to a cross bar 56 by a hinged joint 57, as shown in Figs. 2 and 4.

The grading shoe 25 may be provided with screens of any desired character, for instance similar to those shown in Patent 543,532 and adapted to properly grade and discharge the grain therefrom. The grader shoe is mounted to be vibrated longitudinally by the levers and cross rod connected thereto. In order to produce a vertical vibration a kicker plate 58 is secured to the under face thereof to traverse a roller 59 secured to the side of a collecting hopper 60. This hopper discharges into a slidingly mounted receptacle 61 upon base of the machine.

In the operation of the separator the grain passing through the upper screen travels beneath the aprons and through each of the successive screens, while the material which does not pass through the upper screen travels over the top of the aprons to the discharge spout. The aprons thus prevent upending of the material on the screens and conduct the waste material over each screen so as to obviate any mixing thereof. The grain is thus thoroughly separated from foreign matter during its passage over the stepped screens of the separating shoe so that a complete separation is effected before the grain is discharged into the wind pipe. This obviates the necessity of a high air pressure which frequently blows out the grain with the foreign material, but permits the chaff and light material to be carried off by a constant moderate blast, not sufficient to affect the fall of grain by gravity to the grader screen disposed at the lower end of the wind pipe and below the connection of the wind passage therewith. The blast of air is regulated by the adjustable draft boards at the openings to the fan casing. The kicker plate at the upper end of the grader screen gives it a vertical vibration, which keeps the screen clean and effects a perfect grading thereon. The connection for vibrating the separator and grader shoes from the fan shaft effects a very rapid movement thereof which consequently perfects and increases the cleaning capacity of the machine. It will thus be seen that the foul grain and foreign material is separated and discharged at a different point from the good grain and seed before the latter is subjected to the wind to remove the chaff therefrom and later graded upon the lower screen in its cleaned condition. The separator therefore presents a rapidly operating and efficient construction combined with a simple structure which can be economically manufactured.

Having described my invention and set forth its merits what I claim and desire to secure by Letters Patent is—

1. In a grain separator, a separating shoe having stepped imperforate floors and a transverse conducting chute at its lower end spaced therefrom to provide a discharge opening, an independent frame disposed within said shoe and provided with stepped screens located above said floors with the lowermost thereof discharging into said chute, and a series of aprons upon said screens delivering to each other and to said chute.

2. In a grain separator, a separating shoe, a grader shoe, a wind pipe to conduct from one shoe to the other, a fan casing communicating with said pipe, a shaft provided with a fan within said casing, a pivoted lever connected at one end to an eccentric pin on said shaft and at its other end to the lower part of the grader shoe, a rock shaft disposed beneath and connected to the separating shoe, and a connection from an eccentric pin on said fan shaft to said rock shaft.

3. In a grain separator, a separating shoe, a grader shoe, a blast fan having its shaft provided with a crank pin at one end, a pivoted lever embracing said pin and connected to said grader shoe, a rock shaft connected to vibrate the separating shoe and having a crank arm thereon, and a pitman from said arm to said pin.

4. In a grain separator, a separating shoe, a grader shoe, a blast fan having its shaft provided with a crank pin at each end, pivoted levers at opposite sides of the separator beneath said shaft and directly connected to said pins, a cross rod connecting said levers, sockets upon the lower end of the grader shoe seated on said rod, and a connection from one fan shaft pin to vibrate the separating shoe.

In testimony whereof I affix my signature in presence of two witnesses.

FRANK G. LYMAN.

Witnesses:
ANTHONY STENGER,
HARRY EICHLER.